May 14, 1957 E. K. AMUNDSEN 2,792,175

CARD READING STATION

Filed May 2, 1955 2 Sheets-Sheet 1

EARL K. AMUNDSEN
INVENTOR

BY Henry Heyman
ATTORNEY

May 14, 1957 E. K. AMUNDSEN 2,792,175

CARD READING STATION

Filed May 2, 1955 2 Sheets-Sheet 2

EARL K. AMUNDSEN
INVENTOR

BY Henry Heyman
ATTORNEY

United States Patent Office 2,792,175

Patented May 14, 1957

2,792,175

CARD READING STATION

Earl K. Amundsen, Torrance, Calif., assignor to Hughes Aircraft Company, Culver City, Calif., a corporation of Delaware Application May 2, 1955, Serial No. 505,306

6 Claims. (Cl. 235—61.11)

The present invention relates to a card reading station, and more particularly to a mechanical device for supporting photoelectric apparatus for reading data from punched or marked cards which are continuously transported at high speed.

Punched cards are widely utilized for the recording of business data in numerical form. A typical punched card, for example, has a width of 3¼ inches which provides room for 12 rows of holes or apertures, and a length of 7⅜ inches which provides 80 aperture spaces in each row. When it is desired to perform computations upon the recorded data by means of automatic equipment such as a digital electronic computer it becomes necessary to convert the data into electrical form. Not only is it desirable to process the punched cards at a rapid rate, necessitating precision mechanical equipment for handling them, but during card reading operations it is also necessary to maintain exact synchronism between the mechanical movement of a card which is being read and the electrical operation of the reading circuit.

The advantages of a vacuum-drum type of conveyor for processing punched cards at a rapid rate are fully disclosed in copending United States patent application Serial No. 491,378 for "Card Feed Station for High Speed Card Conveyor" by Kenneth R. Carlisle, filed March 1, 1955; and in copending United States patent application Serial No. 507,307, for "Card Receiving Station" by Alfred M. Nelson, filed May 2, 1955. This is now Patent 2,752,154, issued June 26, 1956.

One type of card reading station which may be used with the vacuum drum system of the referenced copending applications is a photoelectric reading station located between a pair of drums. Each card then passes through the reading station as it is being transferred from one drum to the other. The difficulty with this type of reading station is that the necessity for synchronizing the card movement with the operation of the photoelectric reading circuit requires a degree of precision in the synchronous rotation of the two drums wihch it is impracticable to attain.

According to the present invention the reading station may be utilized in conjunction with a single drum. A "hump" is provided adjacent the drum surface and arranged in such a manner that each card temporarily leaves the drum surface, passes over the "hump," and then returns to the drum surface. A light source is arranged beneath the hump and a set of photodiodes or other photosensitive devices are located above the hump, so that the data may be read from each card as it passes over the hump. Reliable synchronous operation is achieved by virtue of the fact that the length of the path over the hump is only a fraction of the length of the card, hence the major portion of each card is always in contact with the drum surface and the card therefore continues to moxe at exactly the drum speed, without any slippage.

It is, therefore, an object of the invention to provide a card reading station for reading data from punched cards as they are transported continuously upon the surface of a vacuum-drum conveyor.

Another object of the invention is to provide a mechanical arrangement for a card reading station whereby the necessary synchronism between the motion of a card to be read and the operation of photoelectric reading circuits may be reliably and conveniently provided.

A further object of the invention is to provide a mechanical arrangement for a card reading station which may be utilized in conjunction with a card conveyor which comprises a single vacuum drum.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figure 1:
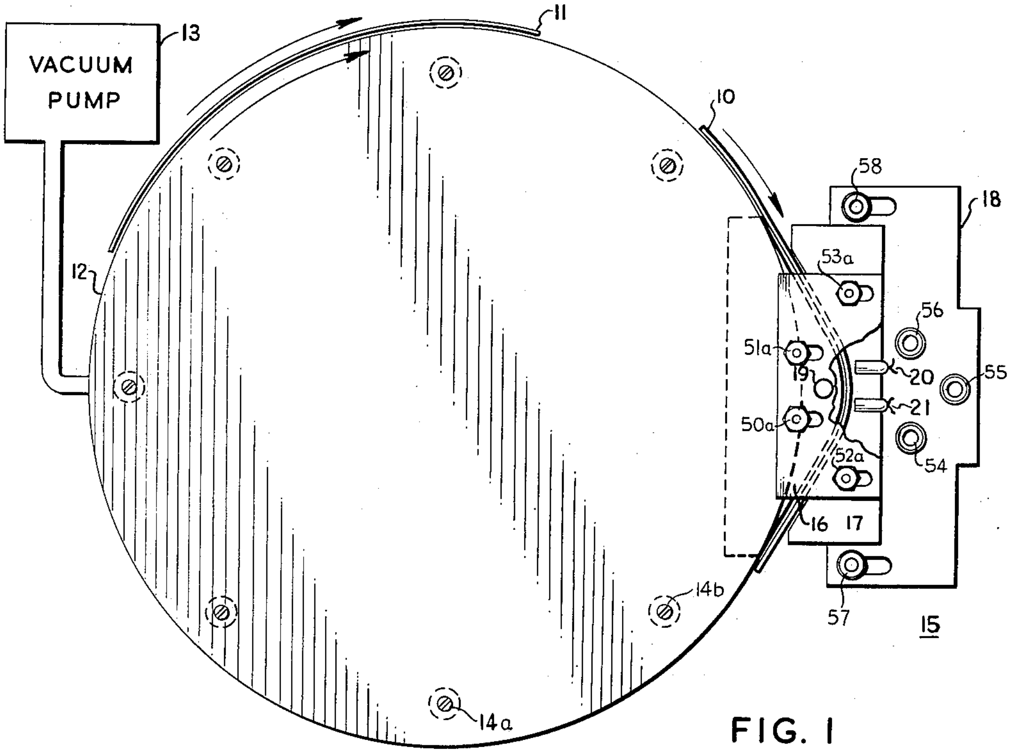
Fig. 1 is a plan view in schematic form of a card reading station in combination with a vacuum drum card conveyor, in accordance with the present invention.

Reference is now made to the drawings where like parts are designated throughout with like reference characters. In Fig. 1 cards 10 and 11 are shown being transported upon the surface of a rotating drum 12, in whish a partial varuum is maintained by means of a vacuum pump 13. A card reading station generally indicated as 15 includes a hump 16 over which the card 10 is passing, a fence 17 enclosing the hump, a supporting base 18, a light source 19 located within the hump between card 10 and the surface of drum 12, and sets of photodiodes or other photosensitive devices 20 and 21 mounted within fence 17 opposite light source 19.

In operation, cards 10 and 11 are transported upon the surface of the drum in the manner shown in Fig. 1, being clamped in place by the partial vacuum within the drum 12. As card 10 passes through the reading station 15 a portion of its length is separated from the surface of the drum and hence deprived of the frictional force by which it is normally propelled. Approximately ⅔ of the length of the card always remains clamped in contact with the drum surface; however, hence adequate propelling forces are available to insure reliable synchronism of the card motion with the motion of the drum.

Light source 19, and the sets of photodiodes 20 and 21, are shown for the purpose of illustrating how the necessary photoelectric reading equipment may be mounted within the card reading station of the present invention. Suitable photoelectric reading equipment has been fully described and claimed in copending United States patent application Serial No. 430,362 for "Electronic Data Translating System" by Ewart M. Baldwin, filed May 17, 1954. In order to utilize the present invention in combination with that of the copending application, it is necessary to have in addition to two vertical columns of photodiodes for reading purposes, as shown, a single photodiode suitably located for detecting the arrival of the leading edge of a card in the reading station, and another photodiode suitably located for detecting the exodus of the trailing edge of a card from the reading station. These two additional photodiodes are not illustrated in the drawings.

Figure 2:
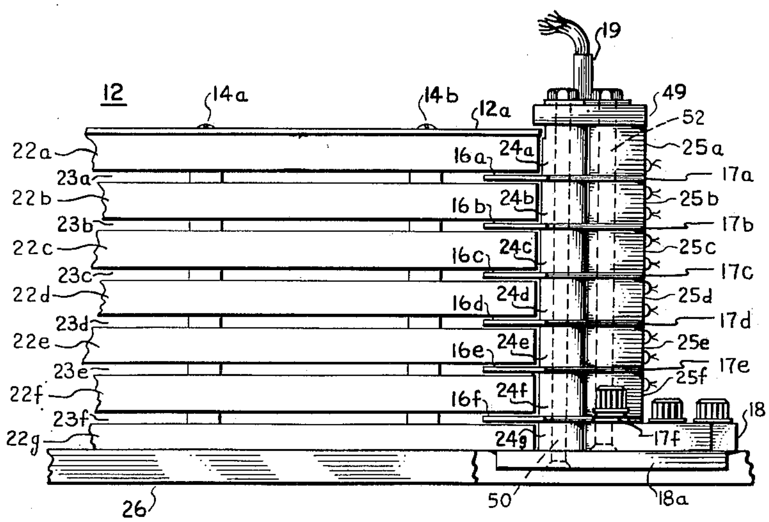
Fig. 2 is a front elevation view of the drum and the reading station of Fig. 1.

Reference is now made to Fig. 2 wherein there is shown an elevation view of the drum and the card reading station of Fig. 1. The drum has an upper flange 12a and is rotatably supported on a table 26. Vacuum grooves or slots 23a . . . 23f are utilized for clamping the cards to the drum surface, and sidewise motion of the cards is inhibited by flange 12a and table 26.

As shown in Fig. 2 the hump 16 is comprised of six pick-off blades 16a, 16b . . . 16f, each riding in a corresponding one of the grooves 23a, 23b . . . 23f in the drum surface. The hump also includes a number of spacers for positioning the pick-off blades, the spacers being designated by reference characters 24a, 24b . . .24g. For example, pick-off blade 16a rides in groove 23a and is supported by spacer 24a from above and by spacer 24b from below. It will be noted that spacer 24a has a portion thereof cut away to accommodate flange 12a of the rotating drum.

In the particular embodiment of the invention as shown the number and location of the pick-off blades has been selected according to the type of card to be read. For a card which has twelve horizontal rows of apertures, pick-off blade 16a is located between the first and second rows, blade 16b between the third and fourth, and so forth, and blade 16f between the eleventh and twelfth rows. Thus the light source 19 is able to fully illuminate each of the twelve rows of apertures.

As shown in Fig. 2 the fence 17 is likewise comprised of six individual blades 17a . . . 17f supported by spacers 25a . . . 25f, each blade being horizontally aligned with the corresponding blade of the hump. Thus, the fence includes guide blades 17a, 17b . . . 17f. Blade 17a is supported from above by a spacer 25a and from below by a spacer 25b. Remaining spacers are designated 25c, 25d, 25e, and 25f. Only six spacers are required in the fence since the bottom guide blade 17f rests upon a base 18, which in turn rests upon supporting table 26. A cover plate 49 is utilized for holding the hump and the fence in place, and rests upon spacers 24a and 25a.

Figure 3:
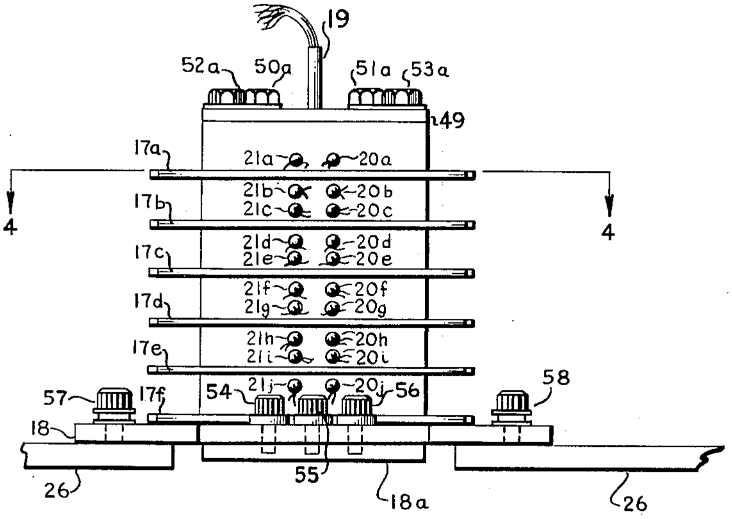
Fig. 3 is a side elevation view of the reading station of Fig. 1.

Additional details of the structure of the reading station will become apparent from Fig. 3. As shown in Fig. 3 the base 18 is affixed to supporting table 26 by means of bolts 57 and 58 located at the left and right ends, respectively, of base 18. A base clamp 18a is connected to the under surface of base 18 by means of bolts 54, 55, and 56. A portion of supporting table 26 is cut away to make room for base clamp 18a.

In Fig. 3 the two sets 20 and 21 of photodiodes are illustrated, respectively comprising diodes 20a . . . 20j and diodes 21a . . . 21j. Each set thus includes twelve reading elements, corresponding to the twelve rows of data on each card to be read.

Figure 4:
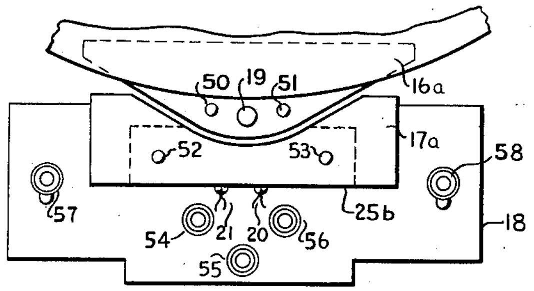
Fig. 4 is a sectional view of the reading station taken as indicated by lines 4—4 of Fig. 3.

Vertical stud bolts are used to hold the hump and the fence structures together. A pair of stud bolts 50 and 51 (also see Fig. 4) pass vertically through the cover plate 49 and through spacers 24a . . . 24g and pick-off blades 16a . . . 16f of the hump. These stud bolts, shown in Fig. 4, are held in place by means of nuts 50a and 51a on top of cover plate 49, as shown in Fig. 3. The bottom ends of these bolts are threaded into base clamp 18a, as shown in Fig. 2.

A pair of stud bolts 52 and 53, located as shown in Fig. 4, pass through the cover plate 49 for holding the structure of the fence in position. These stud bolts are secured to the cover plate by means of nuts 52a and 53a, respectively, as shown in Fig. 3, and the bottom ends of the bolts are threaded into base 18, as shown in Fig. 2.

Reference is now made to Fig. 4 illustrating a horizontal cross section of the structure of the reading station. It will be noted from Fig. 4 that the pick-off blades 16a . . . 16f have a smooth convex curvature while the guide blades 17a . . . 17f have a matching curvature which is concave. The spacing between the hump and the fence is adjusted very carefully to be slightly more than the thickness of a single card.

The spacing between the hump and the fence may be adjusted by loosening bolts 54, 55, and 56 and changing the relative position of base 18 and base clamp 18a. For this purpose the holes in base 18 may be slightly elongated (not shown), and the bolts are actually threaded into base clamp 18a. It is also necessary to loosen nuts 52a and 53a and to change the position of the hump relative to cover plate 49. For this purpose elongated holes are provided in the cover plate, as shown in Fig. 1.

The spacing of the entire reading station with respect to the drum is regulated by adjusting the position of base 18 with respect to the supporting table 26. For this purpose a pair of elongated holes are provided in base 18 for seating bolts 57 and 58, respectively, in any desired position as indicated in Fig. 4. Bolts 57 and 58 are threaded into table 26. It is necessary to adjust the spacing of the reading station from the drum so that the ends of blades 16a . . . 16f ride within the corresponding grooves, beneath the surface of the drum.

The pick-off blades 16a . . . 16f and the guide blades 17a . . . 17f may be made of any suitable material having a low coefficient of friction. Polished phenolic has been found satisfactory in actual use.

Certain dimensions of the reading station appear to be critical. With a drum diameter of ten inches the maximum practical height of the hump relative to the surface of the drum appears to be one-half inch. If the hump has a greater height, slippage between card and drum may be encountered. Spacing between the hump and the fence also appears critical, a spacing of between 10 and 14 mils, corresponding to 1½ to 2 card thicknesses, providing the most satisfactory operation.

Other dimensions and values which have been used in a particular embodiment, providing satisfactory operation, are as follows:

Length of pick-off blades 16a . . . 16f, 3 inches
Radius of curved portion of pick-off blades 16a . . . 16f and of guide blades 17a . . . 17f, 1 inch
Length of guide blades 17a . . . 17f, 2⅞ inches
Width of drum grooves 23a . . . 23f, 0.062–0.063 inch
Thickness of pick-off blades 16a . . . 16f and guide blades 17a . . . 17f, 0.048–0.050 inch
Clear distance between rows of apertures on card, 0.125 inch
Angle between drum surface and ends of pick-off blades, 5°.

The method of assembling the drum and the reading station will now be described. As shown in Fig. 2 the drum comprises seven separate laminations 22a . . . 22g, held together by means of a number of bolts such as 14a and 14b. A spacer washer is provided between each pair of adjacent laminations so that the proper width of the vacuum groove or slot will be maintained. Driving means for rotating the drum, and the particular manner of supplying the vacuum to the inner portion thereof, are not described here for the reason that they form no part of the present invention and will be readily apparent to those skilled in the art.

The reading station is assembled by first putting together all of the pickoff blades 16a, . . . and their associated spacers 24a, . . . . The stud bolts 50 and 51 are then inserted to hold all of these parts together, and are threaded into base clamp 18a. Cover plate 49 is placed on top. Guide blades 17a, . . . and their associated spacers 25a, . . . are then assembled together, and along with base 18 are "sandwiched" between the cover plate 49 and base clamp 18a. Nuts 50a and 51a are then fastened down. Stud bolts 52 and 53 are threaded into base 18 and nuts 52a and 53a are fastened down on top of the cover plate. Base 18 is then fastened to base clamp 18a by means of bolts 54, 55 and 56. The entire reading station is then placed in position relative to the drum and secured by means of bolts 57 and 58, which fasten base 18 to the supporting table 26.

After the mechanical assembly of the reading station the light source 19 may be inserted through the cover plate 49 into the hole which is provided for it. Likewise, the two vertical columns of photoelectric reading elements 20 and 21 may then be inserted into holes provided for them in spacers 25*a*, . . . and may be fastened by any appropriate method.

What is claimed is:

1. In a system for reading data photoelectrically from flexible punched or marked cards, said system including a conveyor for transporting the cards, a light source, and a set of photoelectric reading elements; a reading station comprising: a first member having a first hump-shaped surface fixedly positioned with respect to the conveyor and engaging the surface of the conveyor at first and second points to provide a continuous path whereby each card being transported upon the surface of the conveyor enters upon said hump-shaped surface at said first point, moves along said hump-shaped surface, and returns to the surface of the conveyor at said second point; the length of said hump-shaped surface between said first and second points being less than the length of a card, affording continuous engagement of at least one end of a given card with the conveyor for any position of the given card along said hump-shaped surface; a second member having a second concave guiding surface fixedly positioned with respect to said first member and spaced from said first surface by the order of twice the thickness of a card, thereby to guide each card between said surfaces and thence back to the surface of the conveyor; means for supporting the light source in one of said members; and means for supporting the set of photoelectric reading elements in the other one of said members opposite the light source.

2. In a system for reading data photoelectrically from punched cards, said system comprising a rotatable vacuum drum conveyor for transporting the punched cards in a continuous stream at high speed, a light source, and at least one set of photoelectric reading elements; a reading station comprising: means defining a mechanical detour for temporarily detouring each card from the surface of the vacuum drum conveyor along a detour path and thence back again to the surface of the conveyor; means for supporting the light source on one side of said detour path; means for supporting the set of reading elements on the other side of said detour path opposite the light source; and means including the conveyor for maintaining the motion of each card in exact mechanical synchronism with the motion of the conveyor during the time the card is passing along said detour path.

3. In a system of the type including a conveyor having a plurality of evacuated grooves extending along the surface thereof for transporting thereon punched or marked data bearing cards, a card reading station comprising: a plurality of pickup fingers each engaging one of said grooves for separating from the surface of the conveyor a card being transported thereon; means connected to said pickup fingers for supporting a light source between the surface of the conveyor and a card which has been separated from the conveyor; means for supporting a set of photoelectric reading elements on the other side of said card opposite said light source; and mechanical means for directing each card back to the surface of the conveyor after it has passed said light source, whereby each card is continuously supplied with driving power from the surface of the conveyor, thereby to provide reliable synchronism between the mechanical motion of each card and electrical reading of the data of each card.

4. In a photoelectric card reader system for reading data from rapidly moving punched or marked cards, the system including a light source, at least one set of photoelectric reading elements, and a card conveyor having a plurality of partially evacuated closed grooves in the surface thereof, a reading station for passing each card between the light source and the set of photoelectric reading elements, said reading station comprising: a plurality of hump-shaped pick-off blades each engaging one of the grooves for guiding the leading edge of each card being transported upon the conveyor away from the surface thereof along a detour path; means for supporting the light source in a position between the surface of the conveyor and said detour path; a plurality of guide blades, each being located adjacent to and in the same plane with an associated one of said pick-off blades, and positioned so as to provide between the surface of each of said pick-off blades and the surface of the associated guide blade a hump-shaped detour path having a width of the order of two card thicknesses, whereby the leading edge of each card is guided back to the surface of the conveyor; and means for supporting the set of photoelectric reading elements between adjacent guide blades opposite the light source.

5. The device claimed in claim 3 wherein the number of grooves, of pick-off blades, and of guide blades is 6; wherein each punched card has provision for 12 horizontal rows of apertures; and wherein each pair of horizontal rows of apertures on a card passes upon opposite sides of a corresponding one of said pick-off blades during the passage of the card over said pick-off blades.

6. A mechanical arrangement for transporting at high speed a series of punched or marked cards, each containing a plurality of rows of apertures representing binary information, and for presenting the cards to a photoelectric reading station for continuously converting the information into electrical signals while the cards are in motion, said arrangement comprising: a rotatable drum card conveyor having a plurality of annular closed grooves in the peripheral surface thereof; means for maintaining a partial vacuum in at least two of said grooves, thereby to clamp each moving card to said surface; a plurality of pick-off blades of substantially uniform size and shape mounted in a fixed position relative to said drum, each pick-off blade riding within a corresponding one of said grooves, said pick-off blades providing a plurality of convex hump-shaped surfaces, each being contiguous to said drum surface; a plurality of guide blades of substantially uniform size and shape mounted in a fixed position adjacent to said pick-off blades, each of said guide blades having a smooth concave surface positioned with respect to a corresponding one of said pick-off blades so as to provide therebetween a continuous gap having a width of the order of twice the thickness of a card, said gap providing a hump-shaped detour path away from and back to said drum surface, whereby each card being transported upon said drum surface passes through said detour path; means for supporting said pick-off blades and said guide blades in said fixed positions; means for supporting a light source between each two adjacent pick-off blades between said drum surface and said detour path; and means for mounting a photoelectric reading element between each pair of adjacent guide blades on the other side of said detour path opposite said light source, whereby when a card is moving along said detour path, said photoelectric reading element in conjunction with said light source is operative to read a row of the apertures representing binary information from the card.

References Cited in the file of this patent

UNITED STATES PATENTS 2,401,021 Rosenberg et al. -------- May 28, 1946